Feb. 9, 1965

S. PURE 3,169,238

INDICATING SYSTEM

Filed Dec. 1, 1959

INVENTOR.
SAMUEL PURE
BY
AGENT

INVENTOR.
SAMUEL PURE

United States Patent Office 3,169,238
Patented Feb. 9, 1965

3,169,238
INDICATING SYSTEM
Samuel Pure, Rydal, Pa., assignor to the United States of America as represented by the Secretary of the Navy
Filed Dec. 1, 1959, Ser. No. 856,625
3 Claims. (Cl. 340—187)
(Granted under Title 35, U.S. Code (1952), sec. 266)

The invention described herein may be manufactured and used by or for the Government of the United States of America for governmental purposes without the payment of any royalties thereon or therefor.

The present invention relates to an indicating or readout system and more specifically to a system of the character described which facilitates remote indication in digital form of information derived from an impedance remotely varied in accordance with the variation of some condition, for example, the number of pulses received from a pulse source.

A preferred embodiment of the invention permits a counter mechanism to be positioned in accordance with the conductive conditions of an electronic pulse counter. The embodiment further includes provision for synchro or other angular position data which varies in accordance with the actuated condition of the counter mechanism.

It is an object of the present invention to provide an apparatus capable of remotely displaying information in digital form.

It is another object of the invention to provide a system in which a counter mechanism is actuated in accordance with the magnitude of a remotely varied impedance.

It is still another object of the present invention to provide an apparatus in which a counter mechanism is actuated in accordance with the output from an electronic pulse counter.

Other objects and many of the attendant advantages of this invention will be readily appreciated as the same becomes better understood by reference to the following detailed description when considered in connection with the accompanying drawings wherein.

Figure 1:
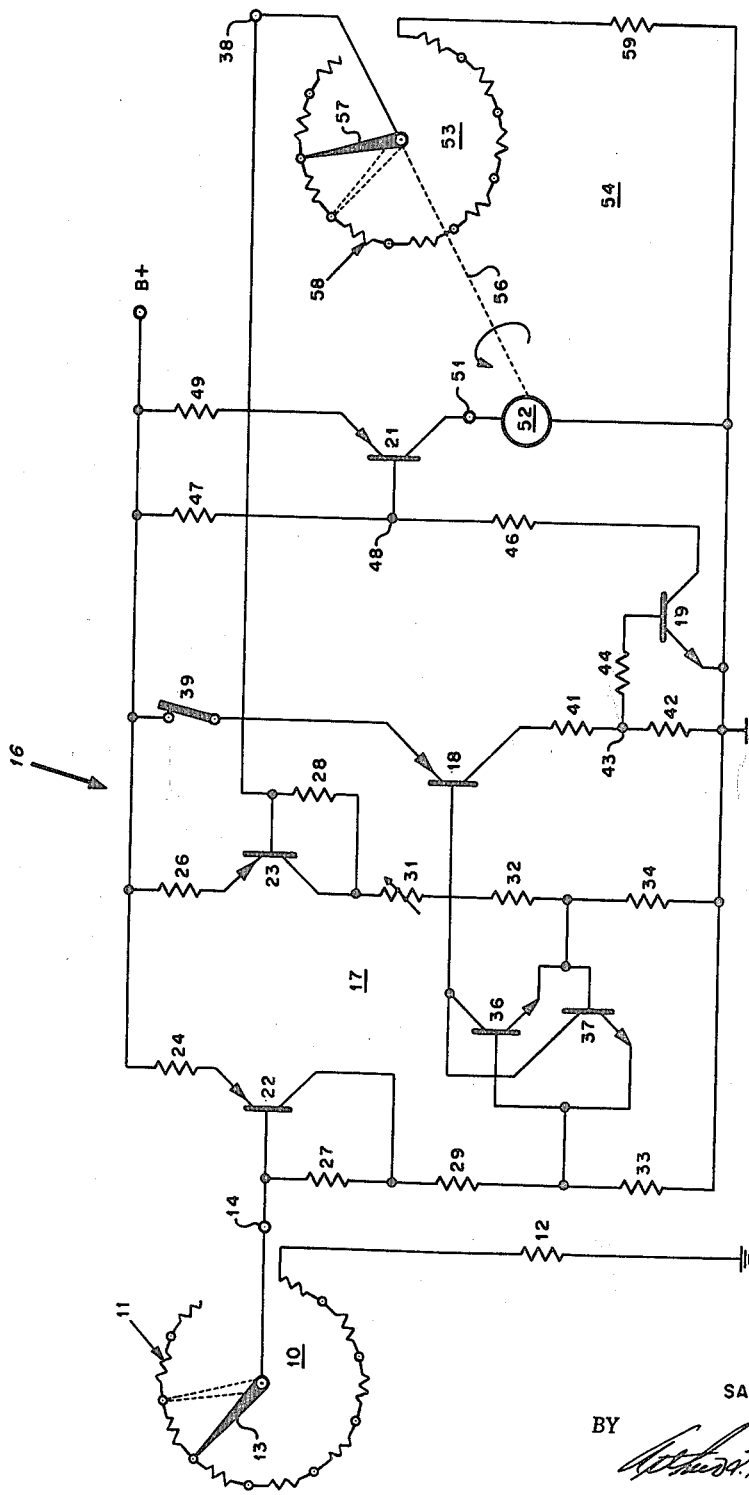
FIG. 1 illustrates a general embodiment of the invention.

Referring now to FIG. 1 there is shown an impedance device 10 which, as will be explained more fully below in the description of FIG. 4, may be varied in accordance with the number of pulses or cycles received from a clock pulse generator, or the like. As is more fully explained in co-pending application Serial No. 106,418 of Samuel Pure and John D. Wallace for Underwater Acoustic Navigation System filed April 26, 1961, the number of cycles or pulses received may be in proportion to the range between an interrogator and a transponder. To facilitate a description of certain features of the invention, impedance device 10 will initially be considered as comprising a plurality of metering resistors 11 which may be connected in series through an additional metering resistor 12 to a point of reference potential, for example ground. For illustrative purposes, there is shown a mechanically operable means 13 provided to selectively couple a predetermined resistance value between a terminal 14 and the point of reference potential.

Terminal 14 may be coupled by any appropriate means to an error detector and servo amplifier system generally indicated by the reference numeral 16 which includes a transistor bridge circuit 17 the output of which is coupled to a plurality of transistor amplifier stages 18, 19, and 21.

Bridge circuit 17 includes a pair of arms comprising transistors 22, 23 with the emitters thereof respectively coupled through resistors 24, 26 to a source of positive potential such as a B+ power supply and the collectors thereof coupled respectively to a resistor 29 and resistors 31, 32. Resistor 31 may be varied to balance the bridge. Biasing resistors 27, 28 may be connected respectively in parallel with the base-collector circuit of transistors 22, 23.

The remaining two arms of the bridge comprise resistors 33, 34.

A pair of transistors 36, 37 have the base-emitter circuits thereof coupled in back-to-back relation across the balance points of bridge 17, while the collectors thereof are coupled in common to the base of transistor amplifier 18.

Terminal 14 is coupled to the base of transistor 22 while the base of transistor 23 is coupled to a terminal 38 for a purpose to be later described.

The emitter of transistor amplifier 18 is coupled through a disabling switch 39 to the power supply while the collector thereof is coupled through series connected resistors 41, 42 to ground. A portion of the output signal from amplifier 18 is coupled from a terminal 43 intermediate resistors 41, 42 through a resistor 44 to the base of transistor amplifier 19, the emitter of which is connected to ground while the collector thereof is coupled through a pair of series connected resistors 46, 47 to the power supply. The base of transistor amplifier 21 is coupled to a terminal 48 intermediate resistors 46, 47 to be energized by the output signal from transistor amplifier 19 while the emitter thereof is coupled through a resistor 49 to the power supply and the collector thereof is coupled to terminal 51 of a counter mechanism 54 which comprises a motor 52 and a precision potentiometer 53.

Terminal 51 is coupled to one input lead of motor 52 while the other input lead thereof is connected to ground. Wiper arm 57 is mechanically coupled to motor 52 by a shaft 56 to be driven thereby in the direction indicated. Wiper arm 57 is electrically coupled to terminal 38.

Figure 2:
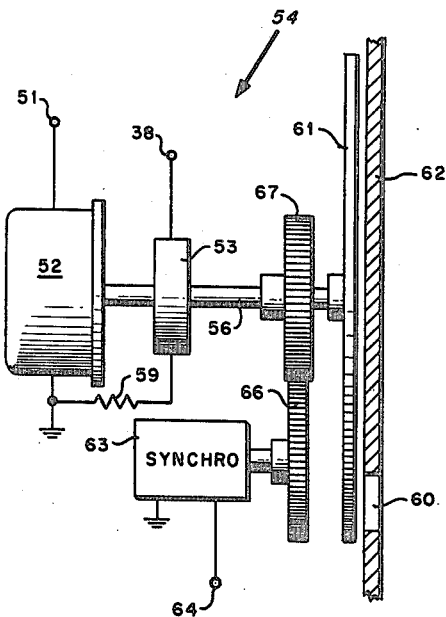
FIG. 2 illustrates the counter mechanism of the invention.
Figure 3:
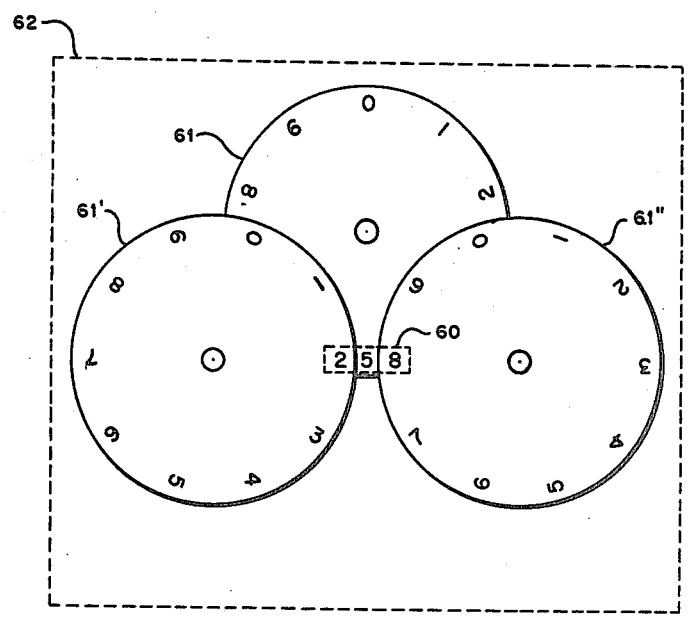
FIG. 3 is another view of a portion of the mechanism illustrated in FIG. 2.

Further details of counter mechanism 54 are shown in FIGS. 2 and 3 wherein parts referred to in the foregoing description of FIG. 1 are indicated by the same reference numerals.

Referring now to FIGS. 2 and 3, it may be seen that a counter wheel or numbered dial 61 is affixed to shaft 56 for conjoint rotation with wiper 57 of potentiometer 53 by motor 52. The indicia bearing periphery of counter wheel 61 may be disposed adjacent an aperture 60 in a panel 62 indicated in broken cross section in FIG. 2 and by dotted lines in FIG. 3. In some applications, for example, to operate remote repeaters or to control position following servomechanisms it may be desirable to provide synchro data which varies in accordance with the angular position of shaft 56. For this purpose a synchro transmitter 63 having an output terminal 64 may be provided and coupled to shaft 56 by gears 66, 67 for conjoint rotation therewith.

For some applications it may be desirable to provide in place of or in addition to synchro 63 wafer switches or potentiometers (not shown) coupled to shaft 56.

Where it is desired to provide plural digit data the circuits and apparatus illustrated in FIGS. 1 and 2 (and FIG. 4) may be duplicated and employed to actuate additional counters 61′ and 61″.

Figure 4:
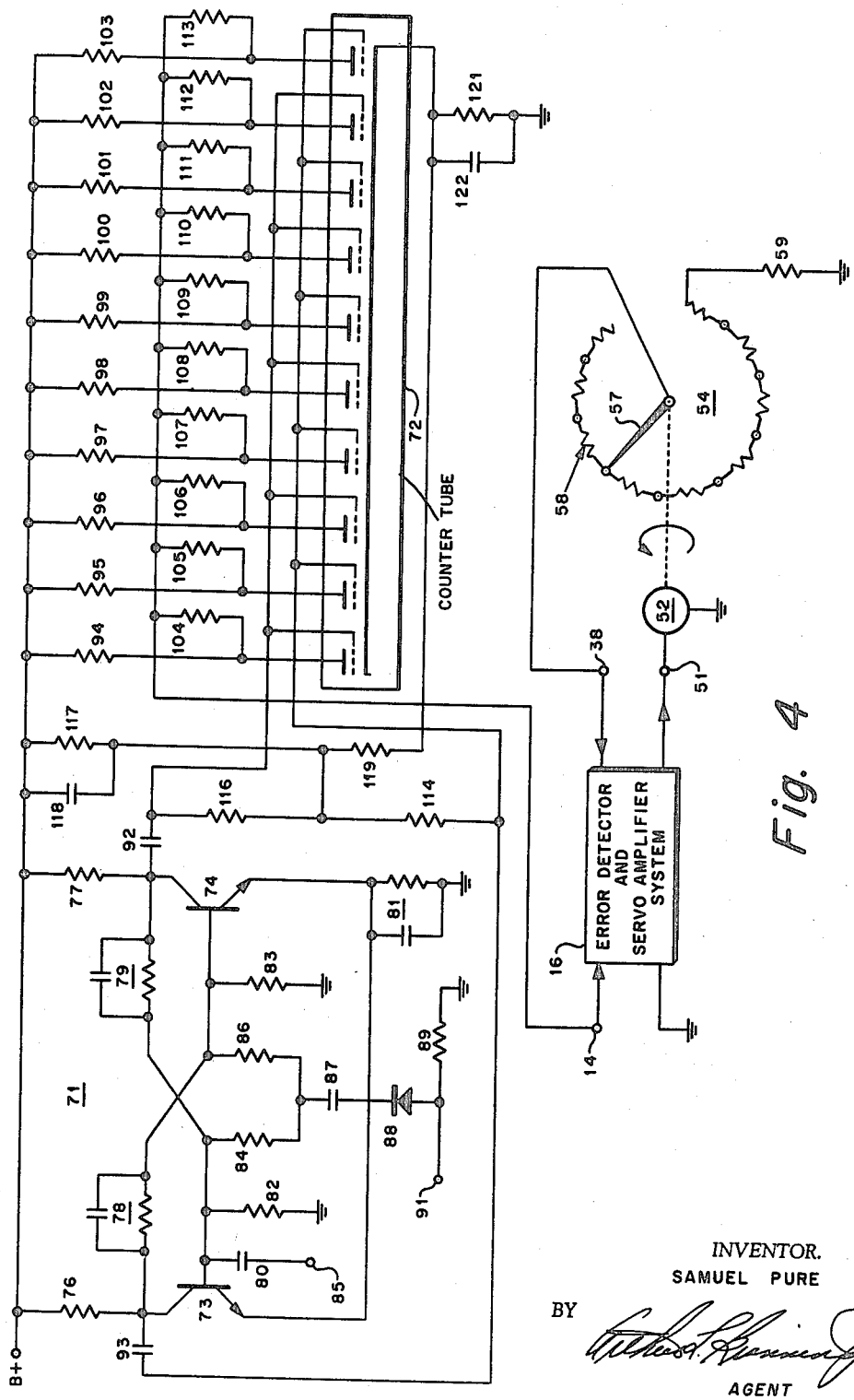
FIG. 4 illustrates a preferred embodiment of the invention.

Before proceeding with a description of the preferred embodiment of the invention illustrated in FIG. 4 the mode of operation of the general embodiment above described will be set forth.

Referring now again to FIGS. 1 through 3, since as illustrated the resistance quantity coupled to terminal 14 is less than that coupled to terminal 38, conduction through transistor 22 will be in excess of that through transistor 23. Accordingly, a voltage differential will exist between the balance points of bridge 17 such that current will flow in the collector-emitter circuit of transistor 36. The collector current of transistor 36 will be amplified by transistor amplifier stages 18, 19, and 21 to energize motor 52 resulting in the rotation of wiper arm 57 to the dotted line position indicated in FIG. 1. At this point bridge 17 will become balanced and motor 52 will become deenergized ceasing to rotate. If now wiper arm 13 be rotated to the dotted line position shown in FIG. 1, bridge 17 will again become unbalanced causing transistor 37 to conduct. The collector current of transistor 37 amplified by transistor amplifier stages 18, 19, and 21 will again cause motor 52 to be energized causing wiper arm 57 to rotate further in the same direction as above described until the wiper arm assumes the solid line position indicated in FIG. 1. It may thus be seen that the circuit of FIG. 1 will operate in such manner that wiper arm 57 and shaft 56 will always assume the same relative position as wiper arm 13, the angular position of shaft 56 being indicated by the position of numbered dial 61.

It is to be understood that impedance device 10 may be located remotely from detector and servo amplifier system 16. The link therebetween may comprise a radio, cable, or wire circuit as desired.

FIG. 4 illustrates a preferred embodiment of the invention, wherein error detector and servo amplifier system 16 and counter mechanism 54 are shown in block diagram and schematic form. As shown in FIG. 4, impedance device 10 may comprise a transistor multivibrator generally indicated by the reference numeral 71 and an electronic pulse counter tube generally indicated by the reference numeral 72 and associated circuitry.

Multivibrator 71 is a bistable transistor multivibrator. Briefly there is provided a pair of transistors 73, 74 with the collectors thereof coupled to a power supply by collector resistors 76, 77. The base-collector circuits of transistors 73, 74 are cross-coupled by networks 78, 79, while the emitters thereof are coupled in common through a biasing network 81 to ground. Resistors 82, 83 are respectively coupled between the bases of transistors 73, 74 and ground. The bases of transistors 73, 74 are further coupled through a network comprising resistors 84, 86, capacitor 87, diode 88, and a grounded input resistor 89 to an input signal terminal 91. A reset pulse terminal 85 may be coupled through a capacitor 80 to the base of transistor 73. The collectors of transistors 73, 74 are respectively coupled through capacitors 92, 93 to alternate grids of counter tube 72.

Counter tube 72, which may be a Burroughs 6701, and associated circuitry is a conventional electronic decade counter except for the provision of metering resistors 104 through 113, the function of which will be described below. For simplicity a showing of the spade circuits of the counter tube has been omitted in FIG. 4.

The anodes of the counter tube are respectively coupled through resistors 94 through 103 to the B+ power supply and through metering resistors 104 through 113 to terminal 14. The grids of counter tube 72 and the cathode thereof are interconnected through resistors 114, 116, and a biasing network comprising resistor 117 shunted by capacitor 118, resistor 119 and resistor 121 shunted by capacitor 122 with the biasing network being connected between the B+ power supply and ground.

Metering resistors 104 through 113 and the anode-cathode circuits of counter tube 72 correspond functionally to the above mentioned resistors 11 and resistor 12 (FIG. 1) and as above described are similarly coupled to terminal 14 which in turn is coupled to error detector and servo amplifier system 16. As above described, counter mechanism 54 is coupled to be energized by error detector and servo system 16.

Assuming that transistor 73 is initially conducting and that the decade counter is in position 1 (conducting through the anode-cathode circuit including resistor 94) whereby resistor 104 is in circuit with terminal 14, the mode of operation of the embodiment of the invention above described is as follows.

If a positive pulse is applied to input terminal 91, the multivibrator will flip to its alternate stable state, transistor 74 conducting and transistor 73 non-conducting. The resulting positive pulse is coupled through capacitor 93 to the grids of counter tube 72 connected thereto causing the decade counter to step to position 2 wherein the anode-cathode circuit of counter tube 72 including resistor 95 is rendered conducting placing metering resistor 105 in circuit with terminal 14.

Successive positive pulses applied to multivibrator 71 will cause the counter tube 72 to sequentially step from one position to the next whereby resistors 104 through 113 are successively placed in circuit with input terminal 14 in accordance with the number of pulses received. Connection of various ones of resistors 104 through 113 in circuit with terminal 14 will cause the remainder of the system illustrated in FIG. 4 to operate in the manner described above.

The system may be reset to its initial condition by applying a negative pulse to reset terminal 85 and to the spade circuits of counter tube 72 (not shown).

It is to be understood that the apparatus of FIG. 4 may be duplicated to provide for actuation of additional counter wheels.

Obviously many modifications and variations of the present invention are possible in the light of the above teachings. It is therefore to be understood that within the scope of the appended claims, the invention may be practiced otherwise than as specifically described.

What is claimed is:

1. An indicating system comprising a bistable multivibrator having an input circuit and a pair of output circuits, an input terminal adapted to be coupled to a pulse source, a pair of multivibrator output terminals, circuit means coupling the input circuit of said multivibrator to said input terminal, circuit means respectively coupling the output circuits of said multivibrator to said multivibrator output terminals, a pulse counter including a counter tube provided with a plurality of anodes and a corresponding plurality of grids, circuit means respectively coupling said multivibrator output terminals to alternate counter tube grids, a plurality of resistors each having a pair of terminals and equal in number to said anodes, circuit means respectively connecting one terminal of each of said resistors to an anode, an output terminal, and circuit means connecting the other terminal of each of said resistors in common to said output terminal whereby the resistance at said output terminal is a function of the number of pulses from said pulse source, variable impedance means; and actuating means operable to vary the impedance of said variable impedance means; an error detector and servo amplifier system including a first input circuit coupled to said output terminal, a second input circuit coupled to said variable impedance means, and an output circuit; and means coupling said means, and an output circuit; and means coupling said actuating means to said output circuit whereby the impedance of said variable impedance means is varied in accordance with the resistance at said output terminal, and an indicator means coupled to said actuating means, to indicate the number of pulses from said pulse source.

2. The combination of claim 1 wherein said error detector and servo amplifier system comprises: an input terminal in said first input circuit coupled to said output terminal, a feedback terminal coupled to said variable impedance means, a bridge circuit having first and second arms each including one of a first pair of transistors, circuit means connecting the base of one of said transistors to said input terminal, circuit means connecting the base of the other of said transistors to said feedback terminal, a second pair of transistors having the base-emitter circuits thereof connected in back-to-back relation across the balance points of said bridge, a plurality of cascade connected transistor amplifier stages each including an input circuit and an output circuit, circuit means connecting the collectors of said second pair of transistors in common to the input circuit of the first of said plurality of transistor amplifier stages, an output terminal, and circuit means connecting the output circuit of the last of said transistor amplifier stages to said output terminal.

3. The combination of claim 2, said activating means being a motor coupled to the output terminal of said error detector and servo amplifier system to be energized thereby, said indicator means being an indicia bearing dial, said variable impedance means being a potentiometer, a shaft mechanically interconnecting said motor, said dial, and the wiper arm of said potentiometer for conjoint relation.

References Cited by the Examiner
UNITED STATES PATENTS

| | | | |
|---|---|---|---|
| 2,454,184 | 11/48 | Kliever | 340—187 |
| 2,663,760 | 12/53 | Buchner | 324—98 |
| 2,889,505 | 6/59 | Sigel | 318—28 |

NEIL C. READ, *Primary Examiner.*

BENNETT G. MILLER, L. MILLER ANDRUS, THOMAS B. HABECKER, *Examiners.*